Nov. 26, 1963 H. G. BLANK 3,112,403

ELECTROLUMINESCENT INFORMATION PROCESSING CIRCUIT

Filed Jan. 3, 1961

INVENTOR.
HANS G. BLANK

BY R. J. Frank
ATTORNEY

United States Patent Office 3,112,403
Patented Nov. 26, 1963

3,112,403
ELECTROLUMINESCENT INFORMATION PROCESSING CIRCUIT

Hans G. Blank, New York, N.Y., assignor to General Telephone and Electronics, Inc., a corporation of Delaware Filed Jan. 3, 1961, Ser. No. 80,223
7 Claims. (Cl. 250—208)

This invention relates to information processing circuits and in particular to information processing circuits utilizing electroluminescent and photoconductive elements.

Information processing circuits designed to receive a momentarily applied input signal, store the information contained therein for a selected period of time, and then erase the information in response to an applied reset signal find wide use in digital computers and in other types of electrical apparatus.

It is an object of my invention to provide an improved information processing circuit utilizing electroluminescent and photoconductive components.

Another object of the invention is to provide an information processing circuit in which separate input and reset switches are used to selectively introduce and erase information from the circuit.

Still another object of the invention is to provide a processing circuit in which information may be stored for any desired period of time.

Yet another object is to provide an information processing circuit in which the output device is isolated from the remainder of the circuit and may have any selected impedance.

A further object is to provide an information processing circuit in which the output may be in the nature of an impedance, optical coupling, or both.

A still further object is to provide an information processing circuit which may be manufactured easily and inexpensively and which requires very little space.

In the present invention, an information processing circuit is provided in which an output electroluminescent cell and a first group of photoconductive elements are connected in series across a pair of terminals. At least one of the photoconductive elements in the first group is optically coupled to the output electroluminescent cell while the remainder of the photoconductive elements in the first group are optically coupled to corresponding reset light sources. A second group of photoconductive elements is coupled in parallel with the first group of photoconductive elements. Each of the photoconductive elements in this second group is optically coupled to a corresponding input light source.

In one embodiment of the invention, the first group of photoconductive elements comprises a first photoconductor optically coupled to the output electroluminescent cell and a second photoconductor optically coupled to a reset electroluminescent cell, the first and second photoconductors being electrically connected in series. The second group consists of a third photoconductor optically coupled to an input electroluminescent cell. The reset electroluminescent cell is energized when voltage is applied across the terminals resulting in the illumination of the second photoconductor and the lowering of its impedance. The output electroluminescent cell is not initially energized however because most of the applied voltage appears across the high impedance of the first photoconductor causing the voltage across the output cell to drop to a low value.

When the input electroluminescent cell is energized, the impedance of the third photoconductor is reduced from a high value to a low value. As a result, most of the applied voltage appears across the output electroluminescent cell causing it to emit light. The light from the output cell illuminates the first photoconductor element and reduces its impedance to a low value. Since both the first and second photoconductor elements are now illuminated, the output electroluminescent cell remains lit even when the input electroluminescent source is deenergized.

The circuit is reset by extinguishing the reset electroluminescent lamp. This causes the impedance of the second photoconductor element to increase and reduce the voltage across the output electroluminescent cell until the cell is extinguished. The darkening of the output electroluminescent cell causes the impedance of the first photoconductor to increase and this further decreases the voltage across the output electroluminescent cell.

The above objects of and the brief introduction to the present invention will be more fully understood and further objects and advantages will become apparent from a study of the following description in connection with the drawings, wherein.

Figure 1:
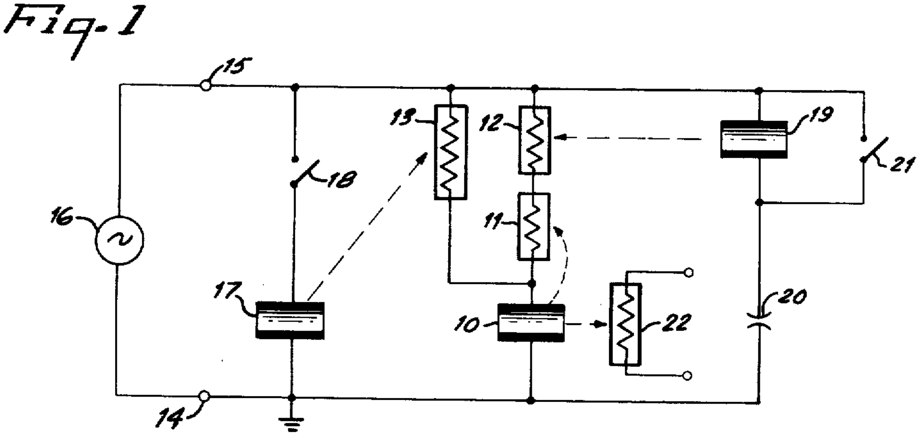
FIG. 1 is a schematic diagram of one embodiment of my invention.

Referring to FIG. 1, there is shown an output electroluminescent cell 10 connected in series with a first photoconductor 11 and a second photoconductor 12. A third photoconductor 13 is connected in parallel with photoconductors 11 and 12. One end of electroluminescent cell 10 is connected to a grounded terminal 14 while the junction of photoconductors 12 and 13 is connected to a terminal 15. A source of alternating voltage 16 is connected across terminals 14 and 15.

An input electroluminescent cell 17 is connected across terminals 14 and 15 through a switch 18 while a reset electroluminescent cell 19 is connected across the terminals through a capacitor 20. The impedance of capacitor 20 is substantially lower than that of electroluminescent cell 19 and therefore, with switch 21 open, most of the applied voltage appears across cell 19. An impedance ratio of approximately 10 to 1 has been found to give excellent operating characteristics.

When voltage is applied across terminals 14 and 15 and switches 18 and 21 are open, output cell 10 is dark since the impedances of photoconductors 11 and 13 are initially high. Since photoconductor 12 is illuminated by electroluminescent cell 19 and has a low impedance almost all of the voltage appears across photoconductor 11.

Closing input switch 18 energizes electroluminescent cell 17 causing it to emit light and illuminate photoconductor 13. The illumination of photoconductor 13 results in a substantial decrease in its impedance and causes most of the voltage applied across terminals 14 and 15 to appear across output cell 10. The lighting of output cell 10 causes photoconductor 11 to be illuminated and its impedance to drop to a low value. Electroluminescent cell 10 is now maintained in an energized condition through photoconductors 11 and 12 and, therefore, increasing the impedance of photoconductor 13 by deenergizing electroluminescent cell 17, does not extinguish cell 10.

The light from electroluminescent cell 10 may be used to actuate directly a load device, illuminate photoconductor 22, or both. Photoconductor 22 is an output device having an impedance that may be matched to that of a given load and which is electrically isolated from the switching circuit. When electroluminescent cell 10 is off, photoconductor 22 has a high impedance and when electroluminescent cell 10 is energized the impedance of photoconductor 22 is low.

Electroluminescent cell 10 may be extinguished by closing switch 21 thereby shorting electroluminescent cell 19. With electroluminescent cell 19 extinguished, photoconductor 12 no longer is illuminated and its impedance rises. This causes the voltage across electroluminescent cell 10 to drop and emit less light resulting in an increase in the impedance of photoconductor 11. The voltage across electroluminescent cell 10 thus drops still further and it becomes dark. The opening of reset switch 21 allows electroluminescent cell 10 to again become energized and reduce the impedance of photoconductor 12. However, the high impedance of photoconductor 11 prevents electroluminescent cell 10 from becoming energized.

If the condition wherein electroluminescent cell 10 is off corresponds to storage of a binary "0" and the lighting of cell 10 corresponds to a binary "1," it is seen that a "1" may be stored in the circuit for any desired length of time by momentarily closing input switch 18 and that the "1" may be erased and replaced by a binary "0" by momentarily closing reset switch 21.

Figure 2:
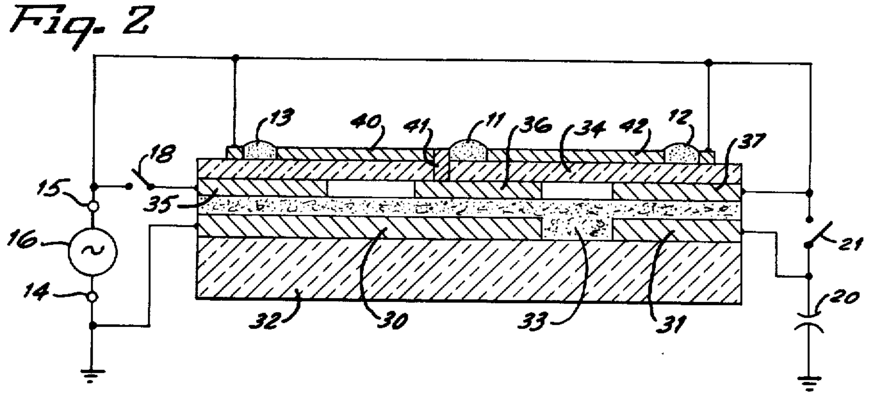
FIG. 2 is a cross-sectional view of a modified form of the circuit shown schematically in FIG. 1.

Referring to FIG. 2, there is shown a cross-sectional view of a modified sequential switching circuit constructed in accordance with the principles of my invention. The device of FIG. 2 differs from that shown schematically in FIG. 1, only in the omission of photoconductor 22. As shown in FIG. 2, first and second conductive layers 30 and 31 are affixed to a glass base 32 and an electroluminescent layer 33 is deposited on to layers 30 and 31. Spaced transparent conductive layers 35 and 36 are placed on electroluminescent layer 33 directly over conductor 30 while a transparent conductive layer 37 is affixed to the electroluminescent layer adjacent conductor 31. A sheet of clear glass 34 is placed over transparent conductors 35–37 and photoconductors 13, 11 and 12 affixed to the glass sheet directly over conductors 35, 36, and 37 respectively. Thus, light from the portion of electroluminescent layer 33 between conductors 30 and 35 falls on photoconductor 13, light from the portion of the layer between conductors 30 and 36 falls on photoconductor 11, and light from the portion of layer 33 between conductors 31 and 37 falls on photoconductor 12. Photoconductors 11 and 13 are connected together by a metallic conductor 40 which may be formed of gold and are also electrically joined to transparent conductor 36 through an aperture 41 in glass plate 34. A metallic conductor 42 joins photoconductors 11 and 12. The operation of the device shown in FIG. 2 is identical with that of FIG. 1 and will therefore not be repeated.

Figure 3:
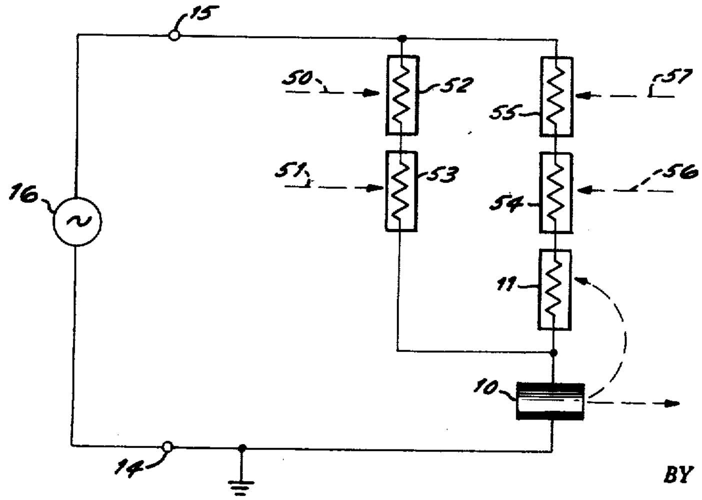
FIG. 3 is a schematic diagram of another embodiment of my invention.

In FIG. 3, there is illustrated an embodiment of the invention in which additional photoconductors are connected in series with electroluminescent cell 10. The light input to each of these photoconductors is shown by a dashed arrow, the actual input or reset electroluminescent lamps (or other light sources) being omitted. In operation, when light from both of the two input sources designated by arrows 50 and 51 impinge upon photoconductors 52 and 53, electroluminescent cell 10 is energized. Light from cell 10 falls on photoconductor 11 and, if photoconductors 54 and 55 are illuminated from light sources 56 and 57 respectively, cell 10 remains energized despite the removal of light source 50 or 51. The circuit is reset by the darkening photoconductors 54 and 55 by removal of light source 56 or 57. In order to satisfy a particular switching application, additional photoconductors can be connected in series or in parallel with photoconductors 50, 51, and 54, 55.

As many changes could be made in the above construction and many different embodiments could be made without departing from the scope thereof, it is intended that all matter contained in the above description or shown in the accompanying drawings will be interpreted as illustrative and not in a limiting sense.

What is claimed is:

1. An information processing circuit comprising a first group of photoconductor elements, an output electroluminescent cell optically coupled to at least one of the photoconductor elements in said first group and optically isolated from the other photoconductor elements in said first group, said first group of photoconductor elements and said output electroluminescent cell being coupled in series between a pair of terminals, each of those photoconductor elements in said first group which are optically isolated from said output electroluminescent cell receiving light from a corresponding reset light source, a second group of photoconductor elements connected in parallel with said first group of photoconductor elements, each of the photoconductor elements in said second group receiving light from a corresponding input light source.

2. An information processing circuit comprising first and second terminals, first and second photoconductor elements, an output electroluminescent cell optically coupled to said first photoconductor element, said first and second photoconductor elements and said output electroluminescent cell being connected in series between said terminals, a third photoconductor element connected in parallel with said first and second series-connected photoconductor elements, and first and second light sources optically coupled to said second and third photoconductor elements respectively.

3. An information processing circuit comprising first and second terminals, first and second photoconductor elements, an output electroluminescent cell optically coupled to said first photoconductor element, said first and second photoconductor elements and said output electroluminescent cell being connected in series between said terminals, a third photoconductor element connected in parallel with said first and second series-connected photoconductor elements, said photoconductor elements having a relatively high impedance when in the dark and a relatively low impedance when illuminated by light from an external source.

4. An information processing circuit comprising first and second terminals, first and second photoconductor elements, an output electroluminescent cell optically coupled to said first photoconductor element, said first and second photoconductor elements and said output electroluminescent cell being connected in series between said terminals, a third photoconductor element connected in parallel with said first and second series-connected photoconductor elements, a reset electroluminescent cell optically coupled to said second photoconductor element, an impedance element having an impedance substantially lower than the impedance of said reset electroluminescent cell, said impedance element and said reset electroluminescent cell being connected in series between said terminals, and an input light source optically coupled to said third photoconductor element.

5. An information processing circuit comprising first and second terminals, first and second photoconductor elements, an output electroluminescent cell optically coupled to said first photoconductor element, said first and second photoconductor elements and said output electroluminescent cell being connected in series between said terminals, a third photoconductor element connected in parallel with said first and second series-connected photoconductor elements, a reset electroluminescent cell optically coupled to said second photoconductor element, an impedance element having an impedance substantially lower than the impedance of said reset electroluminescent cell, said impedance element and said reset electroluminescent cell being connected in series between said terminals, reset switching means connected in parallel with said reset electroluminescent cell, an input electroluminescent cell optically coupled to said third photoconductor element, and input switching means for connecting said input electroluminescent cell across said terminals.

6. An information processing circuit comprising first and second terminals, first and second photoconductor elements, an output electroluminescent cell optically coupled to said first photoconductor element, said first and second photoconductor elements and said output electroluminescent cell being connected in series between said terminals, a third photoconductor element connected in parallel with said first and second series-connected photoconductor elements, a reset electroluminescent cell optically coupled to said second photoconductor element, a capacitor element having an impedance substantially lower than the impedance of said reset electroluminescent cell, said capacitor element and said reset electroluminescent cell being connected in series between said terminals, reset switching means connected in parallel with said reset electroluminescent cell, an input electroluminescent cell optically coupled to said third photoconductor element, input switching means for connecting said input electroluminescent cell across said terminals and a voltage source connected across said terminals.

7. An information processing circuit comprising first and second terminals, first and second photoconductor elements, an output electroluminescent cell optically coupled to said first photoconductor element, said first and second photoconductor elements and said output electroluminescent cell being connected in series between said terminals, a third photoconductor element connected in parallel with said first and second series-connected photoconductor elements, a fourth photoconductor element optically coupled to said output electroluminescent cell, a reset electroluminescent cell optically coupled to said second photoconductor element, a capacitor element having an impedance substantially lower than the impedance of said reset electroluminescent cell, said capacitor element and said reset electroluminescent cell being connected in series between said terminals, reset switching means connected in parallel with said reset electroluminescent cell, an input electroluminescent cell optically coupled to said third photoconductor element, input switching means for connecting said input electroluminescent cell across said terminals, and a voltage source connected across said terminals.

References Cited in the file of this patent

UNITED STATES PATENTS

| | | |
|---|---|---|
| 2,895,054 | Loebner | July 14, 1959 |
| 2,900,522 | Reis | Aug. 18, 1959 |
| 2,900,574 | Kazan | Aug. 18, 1959 |
| 2,954,476 | Ghandi | Sept. 27, 1960 |
| 2,997,596 | Vize | Aug. 22, 1961 |
| 3,050,633 | Loebner | Aug. 21, 1962 |

OTHER REFERENCES

Standeven: Opto-Electronic Ring Counter, IBM Technical Disclosure Bulletin, vol 2, No. 2, August 1959.

Low: Photologic Exclusive Or Block, IBM Technical Disclosure Bulletin, vol 2, No. 5, February 1960.

UNITED STATES PATENT OFFICE
CERTIFICATE OF CORRECTION

Patent No. 3,112,403 November 26, 1963

Hans G. Blank

It is hereby certified that error appears in the above numbered patent requiring correction and that the said Letters Patent should read as corrected below.

In the grant, lines 2 and 12, and in the heading to the printed specification, lines 4 and 5, name of assignee, for "General Telephone and Electronics, Inc.", each occurrence, read -- General Telephone and Electronics Laboratories Inc. --; column 3, line 10, for "10" read -- 19 --.

Signed and sealed this 28th day of April 1964.

(SEAL)
Attest:

ERNEST W. SWIDER
Attesting Officer

EDWARD J. BRENNER
Commissioner of Patents